3,195,554
CONTROL SYSTEM
Ralph Hanna, Toledo, Ohio, assignor to Midland-Ross
Corporation, Toledo, Ohio, a corporation of Ohio
Filed Feb. 15, 1963, Ser. No. 258,845
10 Claims. (Cl. 137—88)

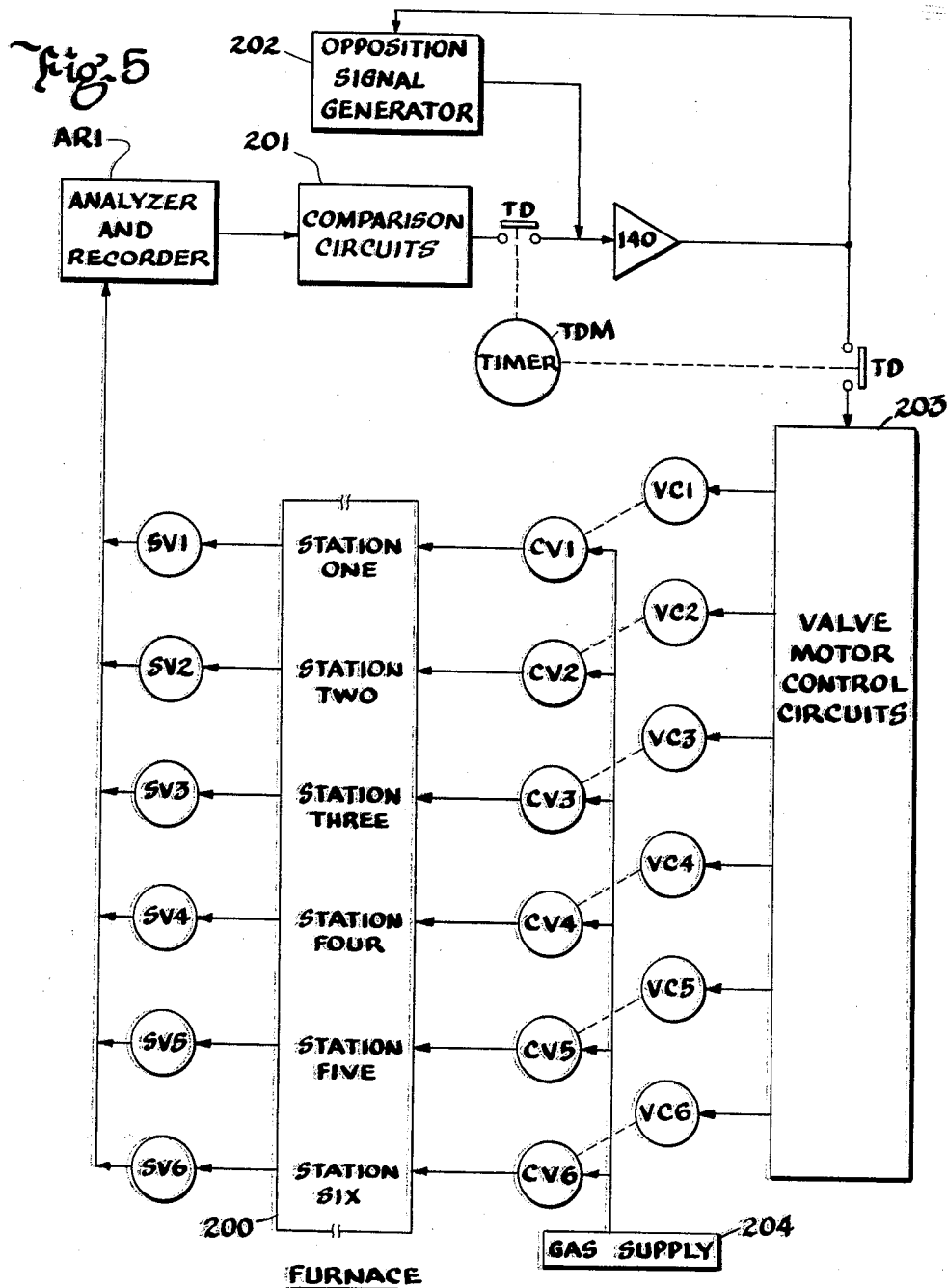

This invention relates to control apparatus in general and, in particular, to a control system including means for periodically sensing a varying condition to be measured at one or more control points and means for controlling a variable of the condition at each of the control points where the condition is being measured.

The present invention provides accurate control of any variable in response to a change in the conditions that exist in a process. The invention is illustrated in an embodiment wherein the equipment described provides a means of recording and controlling the amount of a particular gas at six different sources. The system will cause a final control device to change its position in proportion to the amount of deviation or offset of the actual condition from the desired condition. It is to be noted that the control equipment described herein can be utilized for sensing and controlling a single point or station as well as a plurality of points or stations. The control system features a fast control action, no required reset, individual adjustments for controlling each point, a lack of hunting in the control and a system where one unit may control many points if desired.

A control system having the features and advantages discussed above comprises means for periodically sensing a varying condition to be measured, means responsive to the sensing means for providing an output signal proportional in magnitude to the varying condition when sensed, means for comparing a signal of predetermined magnitude and the output signal to provide a control signal proportional in magnitude to the difference between the compared signals, and control means responsive to the control signal of the comparing means. The control means is adapted to alter within a predetermined limit a variable of the condition being measured in proportion to the magnitude of the control signal, and to accomplish this altering before the next periodic sensing of the condition.

Accordingly, it is the principal object of this invention to provide an improved control system having the advantages outlined above.

Other objects, advantages, and features of the invention will become apparent from the following detailed description of a preferred embodiment thereof when taken in conjunction with the accompanying drawings, in which:

FIG. 5 is a schematic diagram illustrating a preferred embodiment of this invention.

Figure 1:
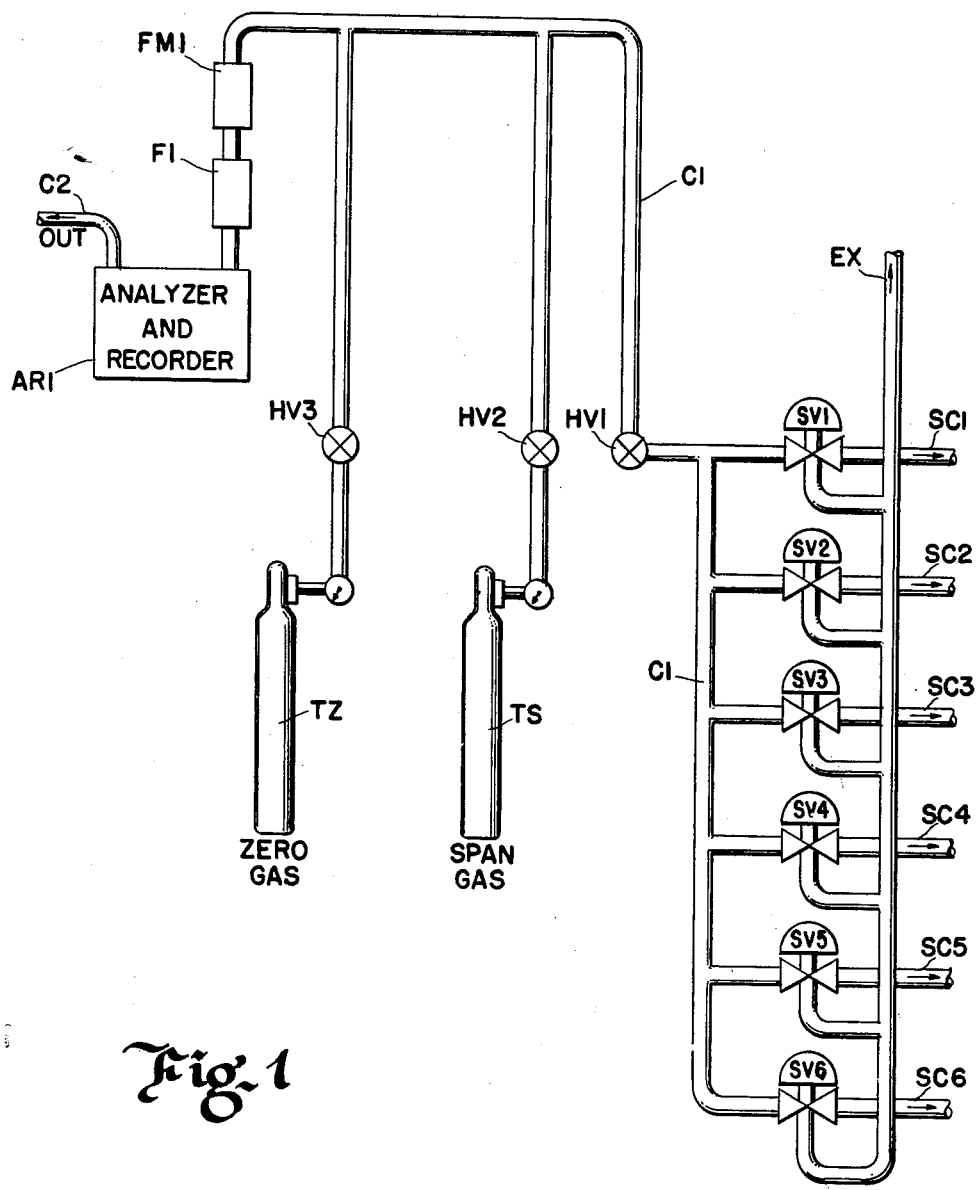
FIG. 1 is a schematic diagram of a sensing and sampling system which may be utilized wtih this invention.

It will be noted in the circuit diagram portions of the drawings (FIGS. 2, 3 and 4) that numbered line diagrams have been utilized. The components can be readily located by reference to the line number where the component is positioned. Further, contact switching operations may be noted without designating a mechanical tie between the contact and the actuating means. The contacts may be located at any convenient position, even though quite remote from their actuating means. Cross reference between the actuating means and its associated contacts is easily accomplished by noting in the right-hand margin of the drawing the reference character of the actuating means, for example RS1, a portion of a rotary switch, adjacent to line number 79 in FIG. 4, the line in which contact actuating means RS1 appears. Following the reference character there are noted the line numbers in which RS1 contacts close when caused to do so by the actuating means, i.e. line Nos. 20, 47, 53, 55, 62, 72 and 85. Other actuating means and their associated contacts are similarly noted. For example, the actuating coil of relay R1 is positioned in line 31, FIG. 2. After the reference character designation R1 in the right-hand margin of the drawing of FIG. 2 there are noted line numbers 41 and 53. This, as above, denotes R1 contacts which will be operated in those lines upon actuation of the relay coil R1 in line 31.

For the purpose of illustrating the invention an embodiment of a control system is shown utilized in connection with the sampling and controlling of gas content at six points along a furnace. Referring to FIG. 1 there are shown six sample lines SC1, SC2, SC3, SC4, SC5 and SC6, which may be connected at one of their ends to points along a furnace from which control samples are desired. Pumps and filters (not shown) may be used in drawing the samples. The other ends of the sample conduit lines SC1 through SC6 are connected respectively to one port of solenoid operated three-way valves SV1, SV2, SV3, SV4, SV5 and SV6. A second port of the three-way solenoid valves SV1 through SV6 is connected to an exhaust conduit EX. The third ports of the three-way solenoid valves SV1 through SV6 are connected to a common sample conduit C1. The sample conduit C1 is connected through a flow meter FM1 and a filter F1 to an analyzer and recorder AR1. An instrument suitable for use in this application as an analyzer and recorder is a model 300 Lira commercially available from the Mine Safety Appliances Company combined with a standard strip chart recording millivolt meter such as a class 15 meter available from Minneapolis-Honeywell. It is designed to measure the percent of a constituent in a gas sample. A gas sample is received from the conduit C1, is directed through unit AR1 for analysis and is exhausted from the analyzer and recorder unit through conduit C2. Continuous visual readings from the analyzer and recorder AR1 are obtained from an instrument control panel 120 shown between lines 17 and 18 of FIG. 2. The control panel 120 may be calibrated to designate the percentage of a constituent in a gas sample between zero and 100 percent.

Referring again to FIG. 1, a hand valve HV1 has been interposed in the conduit C1 between the solenoid valves and the analyzer and recorder unit. This is to enable the exclusion of gas samples from the conduit C1 while the analyzer and recorder is being adjusted for zero setting by the use of the zero gas in tank TZ which is admitted to sample conduit C1 through hand valve HV3, and for checking and adjusting the span of the analyzer and recorder AR1 by the use of the span gas contained in tank TS which is admitted to conduit C1 through hand valve HV2. The zero gas may be a commercially available dry nitrogen. The span gas may be an especially prepared mixture of nitrogen and the type of gas the instrument was designed to check. Adjusting the zero setting and checking and adjusting the span are operations well known to those skilled in the art and will not be described in detail here.

Figure 2:
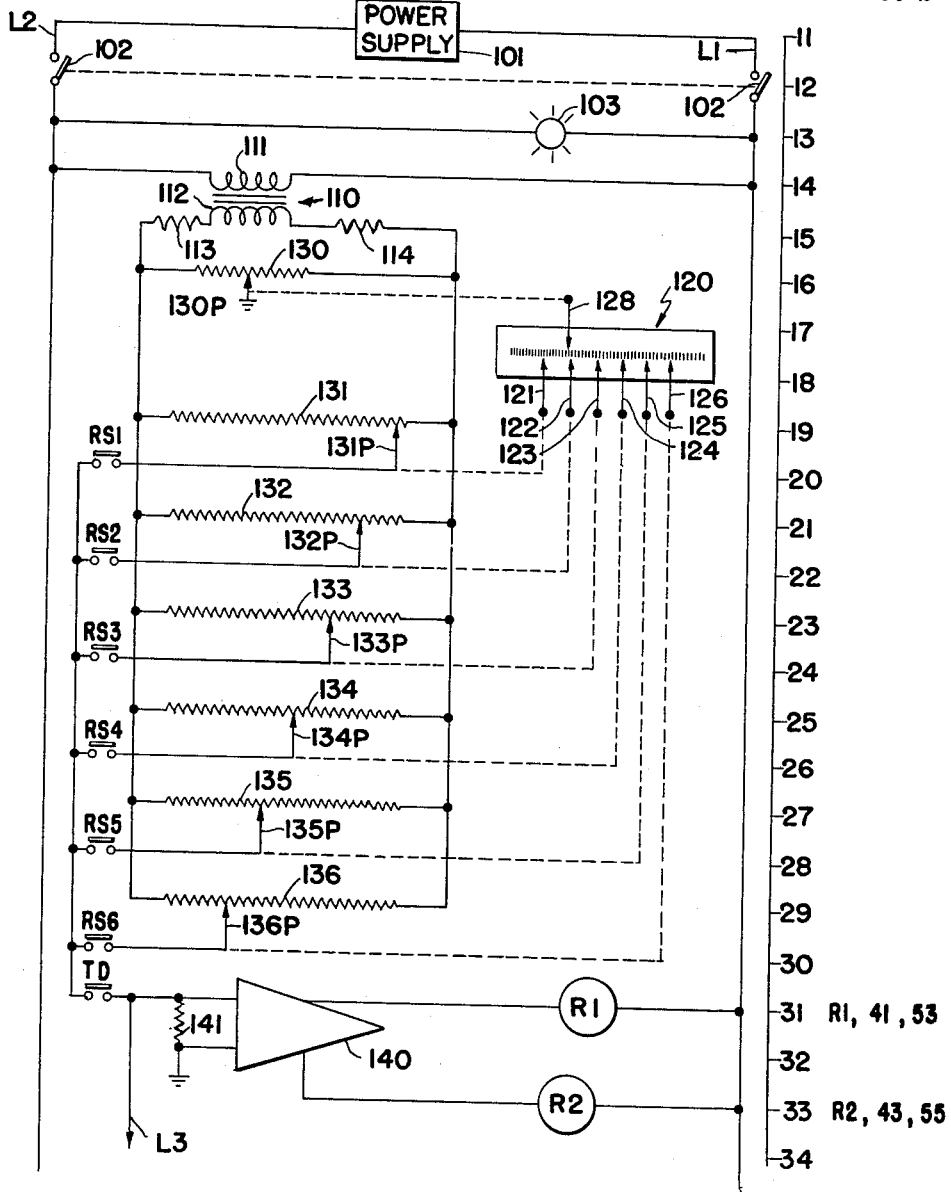
FIGS. 2, 3 and 4 are circuit diagrams of a control system embodying the teachings of this invention.
Figure 3:
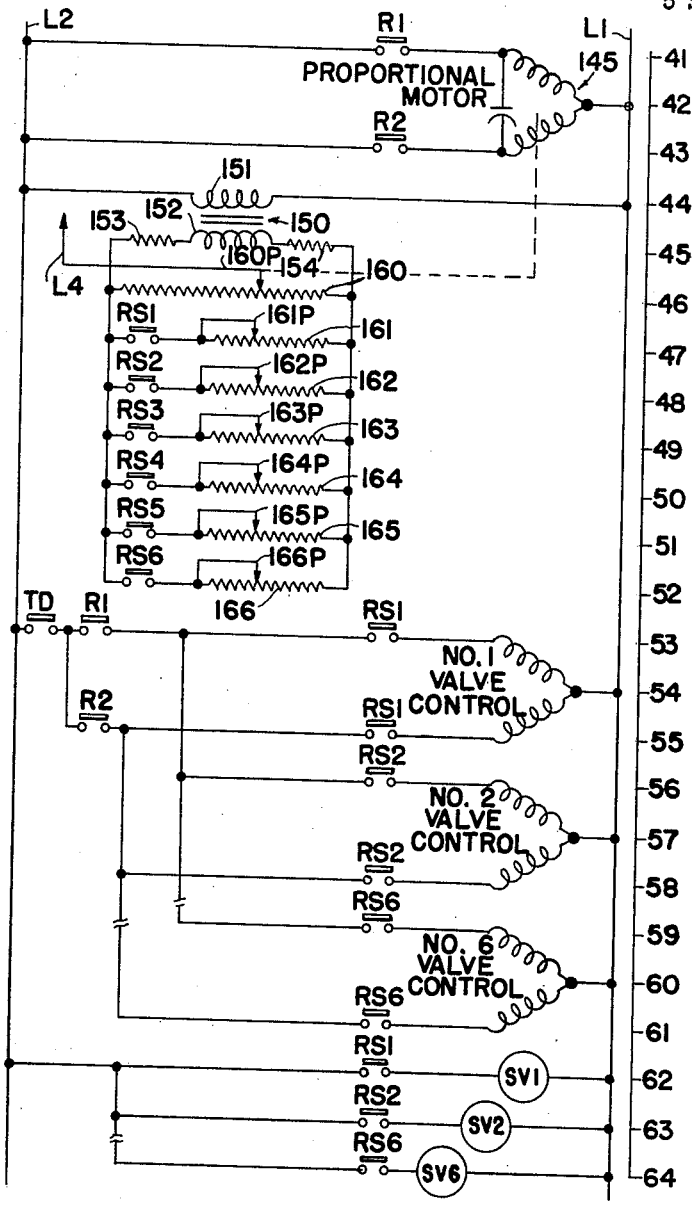
Figure 4:
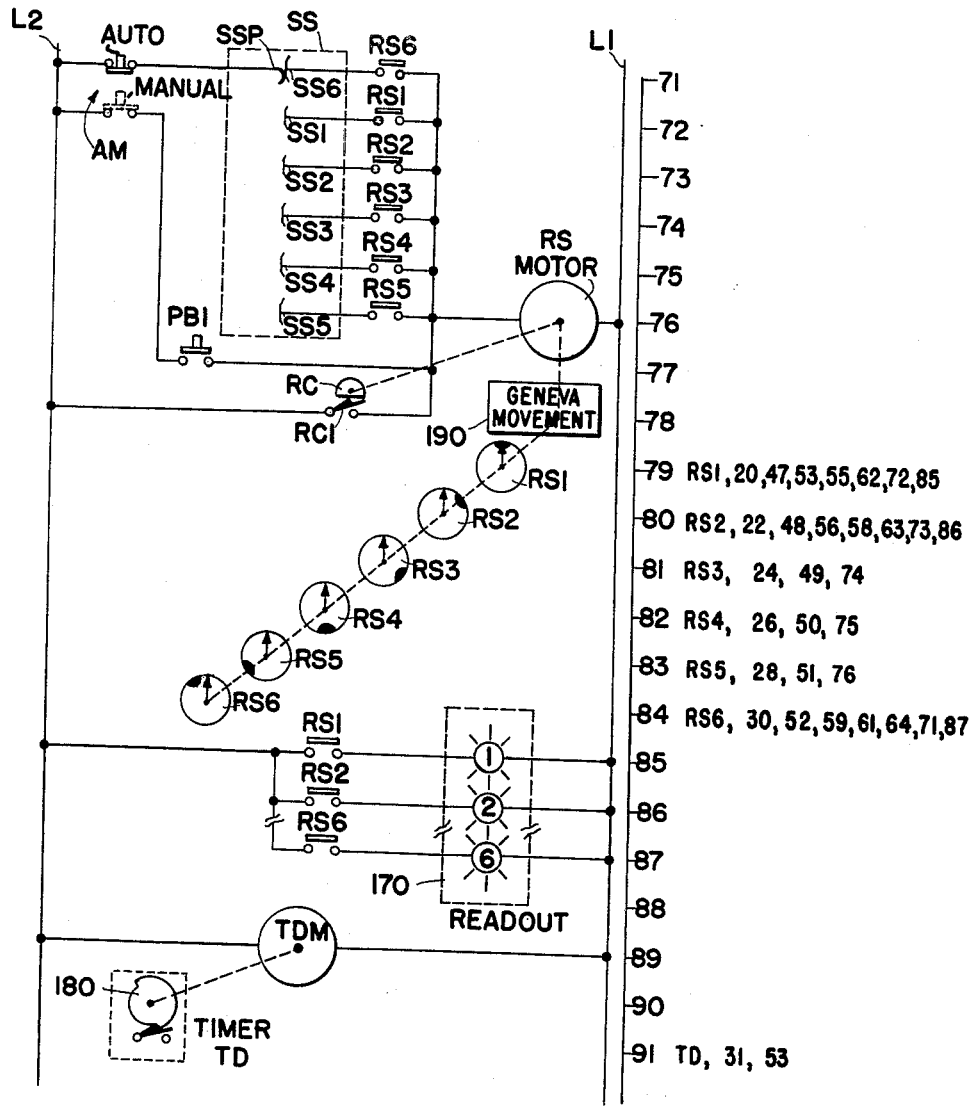

Referring to FIGS. 2, 3 and 4 there are shown circuit diagrams illustrating the operation of the control system of this invention. A power supply 101 in line 11 provides power for the operation of a system. A switching means 102 in line 12 is utilized to turn the system on and off. A pilot light 103 in line 13 indicates when the system is on.

Means are provided for periodically and successively sensing a varying condition to be measured at each of a plurality of control points. This is accomplished by periodically and successively operating the three-way solenoid valves SV1 through SV6 to admit samples of gas from the furnace to the analyzer and recorder AR1.

Energization of the solenoid valves SV1 through SV6 is accomplished by the closure of contacts of a rotary switch in FIG. 4. For the purposes of simplicity the rotary switch has been illustrated as having a motor RS in line 76 which drives a Geneva movement 190 having a six-position star wheel in line 78. The Geneva movement 190 is operative to index contact actuating means RS1, RS2, RS3, RS4, RS5, and RS6, located in lines 79 through 84, one step in response to one rotation of the rotary switch motor RS in line 76. The rotary switch is shown as having six positions so that the rotary switch motor RS must make six revolutions before all of the contact actuating means RS1 through RS6 will have actuated their contacts closed. That is, contact actuating means RS1 is shown in contact actuating position. One revolution of the motor RS will cause the Geneva movement 190 to index the contact actuating means RS1 out of contact actuating position, and will index the contact actuating means RS2 into contact actuating position. Similarly, other successive single revolutions of the motor RS will cause the Geneva movement 190 to index the contact actuating means RS3, RS4, RS5 and RS6 successively into contact actuating positions. Only one of the contact actuating means will be in a contact actuating position after an indexing by the Geneva movement 190. For example, when contact actuating means RS1 is in contact actuating position, the remainder of the contact actuating means RS2 through RS6 will be inactive.

The rotary switch motor RS is connected on one side to power lead L1 and on the other side through a selector switch SS and a switching means AM to power lead L2. Selector switch SS comprises a moving contact SSP and a series of fixed contacts SS1 through SS6 in lines 71 to 76 which are successively contacted by the moving contact SSP. The moving contact SSP may be driven by any suitable motor, for example one utilized for other purposes within the analyzer and recording unit AR1, so that the pointer SSP makes successive contacts with fixed contacts SS1 through SS6. The motor may be geared in this embodiment to move the pointer SSP between fixed contacts SS1 through SS6 at the rate of one contact made per minute. Connection is made from each of the fixed contacts SS1 through SS6 to the rotary switch motor RS via contacts RS1 through RS6, respectively.

As we have noted hereinbefore, rotary switch motor RS via the Geneva movement, 190 has indexed the contact actuating means RS1 into contact actuating position. As a result contact RS1 in line 62 will close actuating the three-way solenoid valve SV1 in line 62. With hand valve HV1 in sample conduit C1 open and hand valves HV2 and HV3 closed, a sample from the furnace is analyzed by the analyzer and recorder AR1 and the constituent percent of the gas sample is registered on the instrument panel 120. Although all of the three-way solenoid valves SV1 through SV6 are not shown in FIG. 3 they are represented by the valves SV1, SV2, and SV6 shown in lines 62 through 64. As the Geneva movement 190 steps the rotary switch around to the six different positions contacts RS1 through RS6 will periodically and successively actuate three-way solenoid valves SV1 through SV6. The analyzer and recorder AR1 is enabled to make a reading on a constituent percentage in each gas sample from each of the six sampling and control points in the furnace.

A transmitting slide wire 130 in line 16 has a pointer 130P that is driven in synchronization with and always has a position directly related to the instrument indicator or pointer 128. Power is supplied to the transmitting slide wire 130 through a transformer 110 having a primary winding 111 connected between power leads L1 and L2 in line 14 and a secondary winding 112 in line 15. Resistors 113 and 114 are connected on each side of the secondary winding 112 to provide current limiting protection if the pointer 130P goes to the extreme end of the slide wire 130.

A series of set point potentiometers 131 through 136 in lines 19 to 29 are connected in parallel with the transmitting slide wire 130. Each of the set point potentiometers 131 through 136 has an adjustable pointer 131P through 136P, respectively. Each of the adjustable pointers 131P through 136P is mechanically connected to a corresponding set point indicator 121 through 126, respectively, in line 18. Each of the set point indicators 121 through 126 may be set with reference to a scale on the instrument 120 at a percentage of constituent gas desired at its corresponding control point in the furnace. The set point potentiometers 131 through 136 correspond to the three-way solenoid valves SV1 through SV6, respectively, since a setting of the potentiometer 131, for example, will indicate that a desired percentage of a constituent gas should be present at the control point from which three-way solenoid valve SV1 is taking its sample.

The moving pointer 130P of the transmitting slide wire 130 in line 16 is connected to ground. Similarly, each one of the pointers 131P to 136P are connected through contacts RS1 through RS6, respectively, at lines 20, 22, 24, 26, 28 and 30 via timer contacts TD at line 31 and a load resistor 141 between lines 31 and 32 to ground.

The load resistor 141 is connected to a signal detector 140 which may be in this embodiment a phase sensitive amplifier. A wiring diagram of the phase sensitive amplifier 140 is found in FIG. 11 of an undated publication entitled "077 Electronic Temperature Controller, Instructions for Installation — Operation — Maintenance, No. 15038G," Minneapolis-Honeywell Regulator Company, Industrial Division, Philadelphia 44, Pennsylvania. The signal detector 140 has two outputs which are utilized to energize either relay R1 in line 31 or R2 in line 33.

Contacts R1 and R2 of relays R1 and R2 are connected in line 41 and 43 to energize for rotation in a desired direction a proportional motor 145. The proportional motor may be a one r.p.m. motor with an electric clutch. The proportional motor 145 is mechanically connected to a movable pointer 160P of a proportional slide wire 160 in line 46. The moving pointer 160P of the proportional slide wide 160 is connected via lead L4 in line 45 and lead L3 in line 34 through the load resistor 141 in line 32 to ground. The proportional slide wire 160 is supplied power by a transformer 150 having a primary winding 151 in line 44 connected between power leads L1 and L2 and a grounded center-tap, secondary winding 152 in line 45. Current limiting resistors 153 and 154 connect the ends of the secondary winding 152 to the proportional slide wire 160. Proportional band adjust resistors 161 through 166 are connected in parallel with proportional slide wire 160 by contacts RS1 through RS6 in lines 47 to 52, respectively. Proportional band adjust resistors 161 through 166 have pointers 161P through 166P, respectively, connected to vary the amount of effective resistance of each of the adjust potentiometers.

Although there are valve control motors for each of the six points being sampled and controlled in the furnace, only three of the valve control motors, No. 1, No. 2, and No. 6, have been shown in FIG. 3 in lines 53 to 61 as being representative of the entire six. The valve control motors are readied for energization by the closure of pairs of rotary switch contacts, i.e. RS1 in lines 53 and 55, RS2 in lines 56 and 58, and RS6 in lines 59 and 61. The winding and thus the direction in which the valve control motors are energized is controlled by the R1 and R2 contacts in lines 53 and 55.

A readout means 170 is indicated in lines 85 through 87. Although only readout lights 1, 2 and 6 have been shown, they are representative of the entire series of stations from 1 through 6. Readout lights 1 through 6 are periodically and successively energized by contacts RS1 through RS6 as shown in lines 85 to 87 to indicate the station or point being checked.

A time delay motor TDM in line 89 is shown mechanically driving a cam 180 in line 90. The cam 180 is operative to act as contact actuating means for contacts TD. In this embodiment the cam 180 acts to close contacts TD for twenty-five seconds and to open contacts TD for thirty-five seconds in one minute cycles. The timer motor TDM may also be utilized through suitable gearing to drive the movable pointer SSP of the selector switch SS in line 71.

Referring now to FIGS. 2, 3 and 4 an operational cycle will be described. The timer motor TDM is driven in synchronization with a printing mechanism in the analyzer and recorded AR1 and is adjusted to open two circuits just before printing occurs. Contact TD at line 31 opens before printing occurs to prevent transmission of any signal to the signal detector 140. Contact TD in line 53 opens to prevent operation of any of the valve control motors in lines 53 to 61 during printing.

The timer motor TDM is adjusted so that the timer motor begins a new timing cycle when the new sample is channeled through the analyzer and recorded AR1. At the end of approximately thirty seconds the timing contacts close including the contacts TD in line 31. Assume that a cycle is just beginning and that contact actuating means RS1 has moved to actuating position. Contacts RS1 in line 20 close. The instrument pointer 128 moves to a place on the scale indicating the percentage of a certain gas in the sample received through three-way solenoid valve SV1. Solenoid valve SV1 had previously been energized by the closure of contacts RS1 in line 62. The position of instrument pointer 128 in line 16 is reflected by a corresponding position of slide wire pointer 130P. If there is any difference in the position of the instrument slide wire 130P and the set point potentiometer 131P representing station 1 in the furnace, a voltage will appear from the set point slide wire pointer 131P through the closed contact RS1 to ground.

The closure of contacts TD in line 31 allows the appearance of the output signal, proportional in magnitude to the variance between the pointers 130P and 131P, across the load resistor 141. This output signal will be either in phase or 180° out of phase with reference to the line voltage across power leads L1 and L2. One of such phases at the input of the phase sensitive amplifier 140 will produce an output that will energize relay R1 in line 31. The second of such phases at the input of the phase sensitive amplifier 140 will cause the energization of relay R2 in line 33.

If relay R1 has been energized contacts R1 are closed in line 41 to energize one winding of proportional motor 145. Contacts R1 will also close in line 53 to energize one winding of the No. 1 valve control motor to cause the valve being controlled to open further to allow more of the constituent gas being controlled to be fed to the furnace at control point or station No. 1. If, on the other hand, relay R2 is energized contacts R2 will be closed in line 43 to energize the other winding of the proportional motor 145 and drive the motor in the opposite direction, and contacts R2 will be closed in line 55 to energize the No. 1 valve control motor in a direction to close the valve and reduce the amount of constituent gas being fed to the furnace at control point or station No. 1.

At the beginning of a cycle the proportional slide wire pointer 160P is at the electrical center of the proportional potentiometer 160 with reference to the grounded center-tap of the secondary winding 152 of the transformer 150. Whichever of the output relays R1 or R2 is energized its respective contact will be closed in line 41 or 43 to energize the proportional motor 145 to drive the pointer 160P of the proportional potentiometer 160 in a direction to produce a signal in opposition to that already being provided across the load resistor 141 between lines 31 and 32. Since the set point potentiometer pointer 131P and the proportional slide wire pointer 160P are connected across load resistor 141, the voltage appearing across resistor 141 or the apparent signal to phase sensitive amplifier 140 will be reduced as the proportional slide wire pointer 160P is moved. This reduction in voltage across resistor 141 will continue until the voltage difference is zero.

When the voltage across resistor 141 is zero the energized one of the relays R1 and R2 will be deenergized and its associated contacts opened. Therefore both the No. 1 valve control motor in lines 53 to 55 and the proportional motor 145 will stop. It is evident that the time that a valve control motor and a proportional motor will run will be determined by the voltage difference between the slide wires connected through the load resistor 141 at line 31. If the difference is large the motors will run for a long time. If, of course, the position of the set point potentiometer pointer 131P exactly matches electrical position of the transmitting slide wire pointer 130P, the voltage difference is zero and the motors will not run. Thus no reset action is required in the control system.

After the No. 1 valve control motor and proportional motor 145 have run to make the required change, they will remain in their respective positions until the timing contacts TD in line 31 and line 53 open. The No. 1 valve control motor will then remain at its last position because contacts TD in line 53 are open, and the proportional time motor 145 will return the pointer 160P to its electrical center, since there is a voltage of the opposite phase now across the resistor 141. The other of the relays R1 and R2 that have not been energized will now be energized closing its associated contacts to drive the proportional motor 145 in the opposite direction. When the pointer 160P in line 46 reaches the electrical center of the potentiometer 160, the voltage signal to the resistor 141 will be zero and the output from the amplifier 140 will be zero. Then the last energized relay will be deenergized and allow its contacts to open, stopping the proportional motor 145.

If the output signal from the set point potentiometer 131 was of such a magnitude that the proportional motor 145 could not run long enough in the twenty-five seconds available to generate an opposing signal of the same magnitude as the output signal, then the operation of the timing motor TDM in opening contacts TD at line 31 will interrupt operation of both motors, even though the No. 1 valve control motor has not been driven to the desired position. This feature is advantageous in that when a large change is required a change is allowed only within predetermined limits to avoid an overshoot on the control. Since, in the system as illustrated, each point or station is checked every six minutes there is sufficient time for the previous change to be completely integrated within the furnace. The next check in six minutes determines if an additional change is required.

As explained above, even though both the proportional motor 145 and the No. 1 valve control motor are still running when the timing contacts TD in line 31 open, the No. 1 valve control motor will cease its operation. However, the proportional motor 145, because of the signal of opposite phase now impressed on the input of the phase sensitive amplifier 140 and the energization of the other of the relays R1 and R2, will reverse its direction of rotation and return the pointer 160P to the electrical center of the potentiometer 160. Since the maximum time either motor could run was twenty-five seconds there is plenty of time within the thirty-five seconds on the other portion of the cycle for the proportional pointer 160P to be returned to the electrical center of the potentiometer 160 and be ready for the next cycle.

Assuming that the moving pointer SSP of the selector switch SS has been moving for the last minute and is now contacting fixed contact SS1, current will be delivered through switching means AM, the moving contact SSP, and the contacts RS1 still closed from the last cycle to the rotary switch motor RS in line 76. The contacts RS1 in line 72 will open as the Geneva movement 190 indexes the rotary switch one position forward in response to revolution of rotary switch motor RS. Therefore the rotary switch motor RS is mechanically connected to a cam RC in line 78 which is positioned to actuate closed a microswitch RC1 to insure one full revolution of the rotary switch motor RS. As may be noted in the drawing at line 78 the cam RC actuates the microswitch RC1 closed for almost all of one revolution of the cam RS. As one revolution of the cam RC is completed the flat portion of the cam RC allows the microswitch RC1 to open, thus removing the power from rotary switch motor RS.

During its one revolution the rotary switch motor RS has through the Geneva movement 190 at line 78 indexed the contact actuating means RS1 through RS6 one position. All contact actuating means with the exception of RS2 are now opened. RS2 contacts close in line 63 to energize the three-way solenoid valve SV2 to allow a new sample to enter the analyzer and recorder AR1. The timer motor TDM in line 89 again starts timing to allow the new sample to cause any change in the reading on the instrument panel 120 and to allow instrument pointer 128 to come to a balance at such a reading. At the end of thirty-five seconds contacts TD again close.

Contacts RS2 in line 22 are closed and, with the now closed contacts TD in line 31, an output voltage will appear across load resistor 141 if there is any difference in the position of the instrument slide wire pointer 130P and the set point potentiometer pointer 132P. Depending upon the phase of this output voltage with respect to line voltage, one of the relays R1 or R2 in lines 31 and 33 will be energized, closing R1 or R2 contacts in lines 53 or 55 to complete energization of the No. 2 valve motor in lines 56 to 58 and the proportional motor 145 in lines 41 to 43 in the manner described hereinbefore in the previous cycle.

The cycles will continue periodically, successively and automatically in the above described manner as each cycle is completed and the rotary switch motor RS through the Geneva movement 190 in line 78 indexes the contact actuating means illustrated in lines 79 through 84 to each successive position.

Referring to switching means AM in lines 71, 72 of FIG. 4 there is illustrated a two-position switch. When the switch AM is in the position marked by the solid lines the system will function automatically as described above. However, when the switch AM is changed to the position designated by the dotted lines, manual operation of the system is possible. In the manual position the system will not index but will remain in the last position as indicated by the readout device 170. To change to another station a push button PB1 in line 77 is depressed and held until the number of the desired station is indicated by the readout number in the readout means 170. By holding the push button PB1 depressed the rotary switch contact motor RS continues to make single revolutions and index the contact actuating means through the Geneva movement 190 in line 78 until the desired position is reached. When the switching means AM is returned to the position shown in the solid lines normal automatic operation will be restored. However, the means driving the movable contact SSP of the selector switch means SS will have to "catch up" with the number indicated in the readout 170 before the selector switch SS will follow in the normal cycling.

Proportional band adjust resistors 161 through 166 in lines 47 through 52 have been provided to control the voltage that is available on the proportional slide wire 160. When the resistance of a particular adjust resistor such as 161 is set to a low value, a large amount of current will flow through the current limiting resistors 153 and 154 and thus cause a large voltage drop across the limiting resistors. This reduces the voltage across the proportional slide wire 160 to a very low value. Even if there were only a small offset from the desired condition, if the voltage on a proportional slide wire is very low, the proportional motor 145 will run as long as the timing switch is closed. If the resistor 161 were set for a large value, the available voltage on resistor 161 would be high and the proportional motor would run only a very small amount to balance a very large offset. From the above it may thus be seen that the proportional band may be varied within wide limits to obtain the degree of control desired.

Referring to FIGURE 5 there is illustrated schematically a preferred embodiment of the invention described hereinbefore. A furnace 200 has six supply and sample stations. Sampling valves SV1 through SV6 periodically sample the gas mixtures at the stations in accordance with the conduit layout of FIGURE 1 and with the electrical control circuitry illustrated in lines 62 to 64 of FIGURE 3 and lines 71 to 84 of FIGURE 4 and described hereinbefore.

Each sample is analyzed by the analyzer and recorder AR1. The analyzer AR1 produces an output signal proportional to the actual percentage of a constituent of the mixture being measured. (See lines 16 to 18 of FIGURE 2.) Comparison circuits 201 compare the output signal with a signal indicating the desired amount of constituent in the mixture (see lines 16 to 30 of FIGURE 2) to produce a control signal. The control signal is fed to a detection device 140, in this example a phase sensitive amplifier. The output of the detection device 140 initiates operation of the valve control motor circuits 203 and the one of the valve control motors VC1 through VC6 associated with the station being sampled. (See lines 53 through 61 of FIGURE 3.) The operation of the particular valve control motor energized controls an associated one of the flow control or valve devices CV1 through CV6, to control the flow of the constituent from the gas supply 204 to the station involved of the furnace 200.

The output of the detection device 140 also initiates operation of an opposition signal generator 202. (See circuits in lines 41 to 52 of FIGURE 3.) The opposition signal generator 202 generates an opposition signal that increases in magnitude until it equals the magnitude of the control signal. The control and opposition signals are opposite in sign and are combined at the input of the detection device 140. When their magnitudes are equal the input signal to the detector 140 becomes zero and therefore the output of the detector becomes zero, disabling the valve motor control circuits 203.

A timing means TDM is synchronized with the periodic sampling and analyzing of valves SV1 through SV6 and the analyzer AR1, so that the signals from the comparison circuits 201 and the signal to the valve control motor circuits 203 are interrupted by contacts TD during the latter portion of each sampling period. This allows the control apparatus to reset and prevents hunting of the apparatus in instances where large corrections are required.

There has thus been described a control system for a plurality of control points comprising means for periodically and successively sensing a varying condition to be measured at each of said plurality of control points. Means responsive to said sensing means are provided for producing an output signal proportional in magnitude to said varying condition as each control point is sensed. Each output signal as produced is compared to a signal of predetermined magnitude to provide a control signal proportional in magnitude to the difference between said compared signals. Control means responsive to the control signals is provided which is adapted to alter within a predetermined limit a variable of the condition being sensed in proportion to the magnitude of the control signal, and before the next periodic sensing of the condition.

The control means include means for providing incremental changes in a variable per unit of time and timing means which limits the total time for the changes during each sensing period. The control means further includes means for generating an opposition signal which increases in magnitude per unit of time within a period in response to a sensing of a condition and means for combining the opposition signal and a control signal. The combining means is operative to deactivate the control means in response to an equality of opposition and control signals.

In conclusion it is to be noted that the embodiment disclosed and described herein is meant to be illustrative only and not limiting in any sense. The embodiment described serves merely to illustrate the spirit and scope of the invention.

I claim:

1. A control system comprising a means for periodically sensing a varying condition to be measured, means responsive to said sensing means for providing an output signal proportional in magnitude to said varying condition when sensed, means for comparing a signal of predetermined magnitude and said output signal to provide a control signal proportional in magnitude to the difference between said compared signals, and control means responsive to said control signal of said comparing means for altering within a predetermined limit a variable of said condition being measured in proportion to the magnitude of said control signal before the next periodic sensing of said condition, said control means including means for providing incremental changes in said variable per unit of time within said period and timing means limiting the total time for said incremental changes within said period.

2. A system according to claim 1 wherein said control means includes means for generating an opposition signal which increases in magnitude per unit of time within said period and means for combining said opposition signal and said control signal, said combining means being operative to deactivate said control means in response to an equality of opposition and control signals.

3. A control system for a plurality of control points comprising means for periodically and successively sensing a varying condition to be measured at each of said plurality of control points, means responsive to said sensing means for producing an output signal proportional in magnitude to said varying condition as each control point is sensed, means for comparing each output signal as produced to a signal of predetermined magnitude to provide a control signal proportional in magnitude to the difference between said compared signals, and control means responsive to said control signals for altering within a predetermined limit a variable of said condition being sensed in proportion to the magnitude of said control signal before the next periodic sensing of said condition, said control means including means for providing incremental changes in a variable per unit of time and timing means limiting the total time for said changes during each period.

4. A system according to claim 3 wherein said control means includes means for generating an opposition signal which increases in magnitude per unit of time within a period in response to a sensing of a condition, and means for combining said opposition signal with each control signal, said combining means being operative to deactivate said control means in response to an equality of opposition and control signals.

5. Control apparatus comprising means for periodically sampling a process and measuring the actual amount of a constituent in said sample, means for providing an output signal proportional in magnitude to said actual amount of said constituent, means for comparing said output signal with a signal of predetermined magnitude representing a desired amount of said constituent to provide a control signal proportional in magnitude to the deviation of said actual amount from said desired amount of said constituent, and control means responsive to said control signal for altering within a predetermined limit said actual amount of constituent in said process, said control means including means for providing incremental changes in said actual amount of constituent in said process per unit of time and timing means limiting the total time for said changes during each period.

6. Control apparatus according to claim 5 wherein said output signal means comprises a transmitting slide-wire with a cooperating pointer adapted to be moved according to the magnitude of the actual amount of constituent measured, and means for applying an electromotive force thereto.

7. Control apparatus according to claim 5 wherein said comparing means comprises a slide-wire having a cooperating pointer adapted to be set to provide a signal of predetermined magnitude, means for applying an electromotive force to said slide-wire, and means for combining said predetermining signal and said output signal to provide said control signal.

8. Control apparatus according to claim 5 wherein said incremental change means includes a flow control device for said constituent in which flow rate is regulated in response to said control signal.

9. Control apparatus according to claim 5 wherein said control means further includes slidewire means with a cooperating pointer adapted to be connected to an electromotive force to generate a signal in opposition to said control signal, and means for combining said control signal and opposition signal to effect deactivation of said control means in response to equality of said opposition and control signals.

10. Control apparatus according to claim 5 wherein said control means includes a flow control device for said constituent, first driving means for altering the rate of flow in said flow control device in response to said control signal, slide-wire means having a cooperating pointer, means for connecting an electromotive force to said slide wire means, second driving means responsive to operation of said first driving means and adapted to drive said pointer to generate a signal in opposition to said control signal, and means for combining said control and opposition signals to effect deactivation of said control means in response to equality of said signals.

References Cited by the Examiner

UNITED STATES PATENTS

| 2,506,394 | 5/50 | Strange | 137—90 XR |
| 2,509,295 | 5/50 | Glass | 137—487.5 XR |
| 2,928,406 | 3/60 | Cunniff et al. | 137—487.5 XR |

M. CARY NELSON, *Primary Examiner.*

MARTIN P. SCHWADRON, *Examiner.*